Patented Aug. 6, 1940

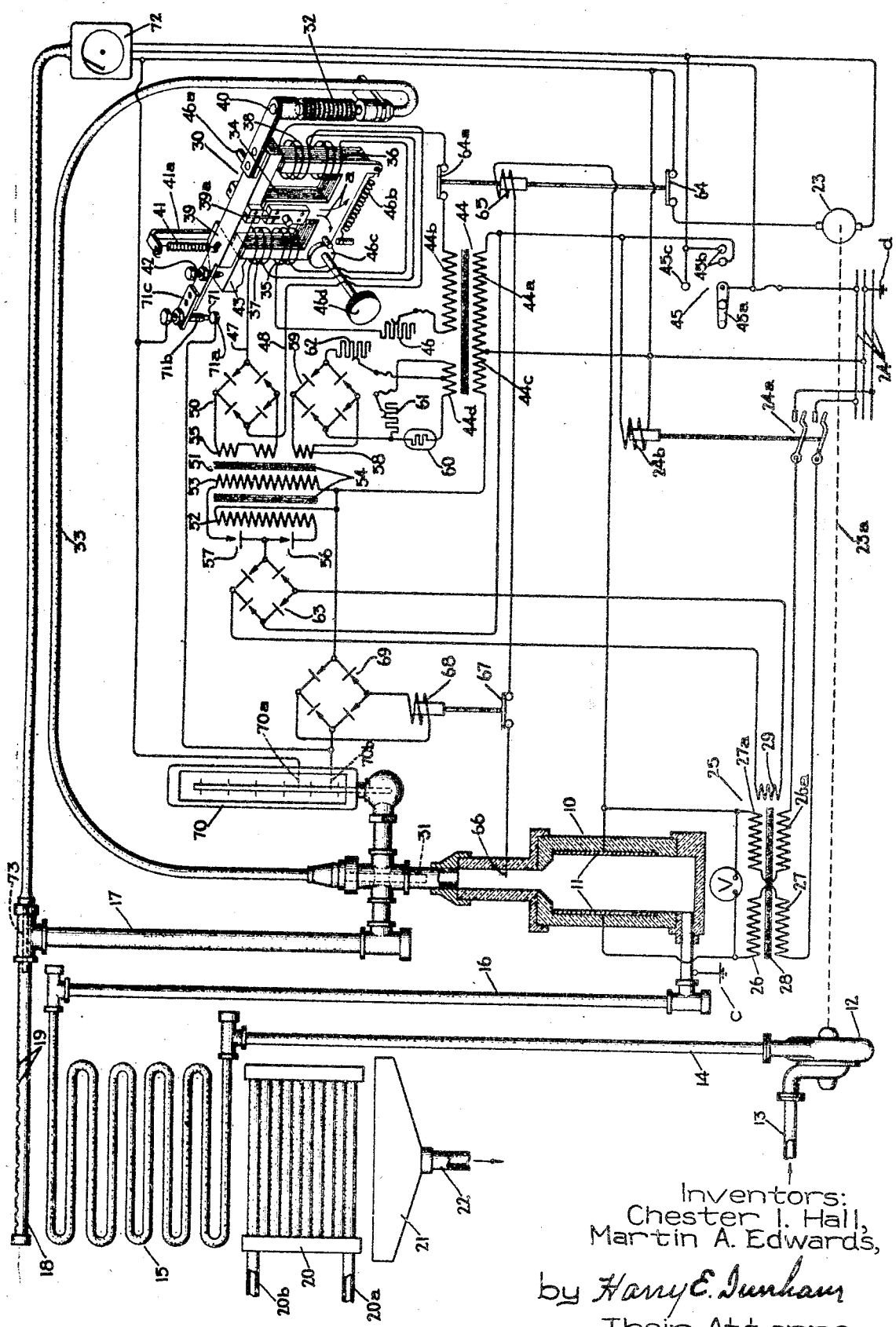

2,210,758

UNITED STATES PATENT OFFICE 2,210,758

HEATING SYSTEM

Chester I. Hall and Martin A. Edwards, Schenectady, N. Y., assignors to General Electric Company, a corporation of New York Application March 8, 1938, Serial No. 194,612

30 Claims. (Cl. 219—40)

This invention relates to heating systems, and it has for its object the provision of improved control means for controlling the temperature in a heating system.

This invention contemplates the provision of improved means for effecting a modulated control of the temperature, as distinguished from a step by step control in which the temperature is abruptly shifted between the maximum and minimum temperatures of a temperature range to hold an average temperature. And it is particularly applicable to a heating system for heating liquids, such as milk, vegetable and fruit juices, beer and the like to sterilize or pasteurize the liquid; and is especially useful in heating systems of this character having spaced electrodes between which the liquid is caused to pass in a stream so as to be heated.

In pasteurizing systems of this character, it is essential that all sections of the moving liquid stream be heated to the required pasteurizing temperature, and that the pasteurizing temperature be held within very close limits.

In certain of the liquid pasteurizing systems before our invention, an effort is made to obtain these requirements by holding a constant voltage on the electrodes, while the rate of flow of the liquid through the system is varied in response to variations in temperature from the desired value. The rate of flow is increased and decreased in steps as the temperature of the milk rises above and falls below the desired pasteurizing value, and while this control holds an average temperature in the liquid stream close to the desired pasteurizing value, certain sections of the liquid stream are overheated and scorched or cooked when the rate of flow is reduced, while other sections alternating with the overheated sections are underheated and do not even attain a temperature sufficiently high to pasteurize the bacteria when the rate is increased.

In certain others of the prior pasteurizing systems, a constant flow of the liquid is established, while the temperature control operates to vary the heating effect of the electrodes in steps as the temperature of the liquid varies. In other words, as the temperature of the liquid rises above the desired value, the control functions to reduce the heating effect of the electrodes, and the temperature of the liquid thereafter falls and ultimately reaches a low value below the desired pasteurizing temperature. The control then steps up the heating effect of the electrodes to again elevate the temperature of the liquid, and the temperature again rises to the elevated high temperature above the desired value. In this way the control holds an average temperature in the stream that is close to the desired value, but, here again, inasmuch as controls of this character are inherently insensitive, some sections of the liquid stream are overheated when the high temperature step is established, and other sections alternating with the first are underheated when the low temperature step is established.

In our control, we use a constant rate of liquid flow, and effect a continuous modulation of the heating effect of the electrodes to hold a temperature extremely close to the desired pasteurizing temperature. The temperature is held within the high and low temperature limits of an extremely small temperature range. Should the liquid temperature tend to vary from the desired pasteurizing value, our control effects almost instantly the necessary correction in the heating effect of the electrodes to restore it to the pasteurizing value. All sections of the liquid stream are subjected to substantially the same heating effect, as distinguished from the prior systems where alternate sections of the liquid stream are subjected to high and low heating effects. The heating effect of the electrodes in our system is not changed in abrupt steps, as in these prior systems, but is modulated as is necessary so as to hold a substantially constant temperature on all sections of the liquid stream.

In accordance with our invention, in one form thereof an impedance device having a direct current control winding, such as a saturable reactor, is connected in the supply circuit for the electrodes. A modulating temperature control element operating in response to the temperature of the heated liquid generates a voltage which is varied as an inverse function of variations in the temperature of the liquid. This voltage is used to control the voltage impressed on the direct current control winding of the reactor so that the voltage impressed on the electrodes is varied as an inverse function of the liquid temperature changes. Therefore, if the temperature of the liquid tends to increase, the voltage of the electrodes is reduced immediately to reduce their heating effect and the temperature in the liquid is restored at once to the desired value; conversely, if the temperature in the liquid falls below that desired, the voltage and heating effect of the electrodes is increased at once to elevate the temperature to the desired value.

Preferably, an amplifier will be used between the temperature responsive element and the direct current control winding so that the relatively large power needed for the winding may be controlled by a relatively small power generated by the temperature element.

We further provide improved means for stopping automatically the flow of the liquid in the event its temperature should fall below a predetermined minimum value; for heating the liquid until it attains a temperature equal to or above this value; and then automatically restarting the continuance flow of the liquid stream.

While we have shown our improved control system as applied to a liquid heater having heating electrodes, it is to be understood that our invention is not limited to liquid heaters of this character, or to liquid heaters, but is more generally applicable, and may be used to control other heating devices, such as an electric resistance furnace.

For a more complete understanding of this invention, reference should be had to the accompanying drawing in which the single figure shows diagrammatically our improved control system as applied to a liquid pasteurizer.

Referring to the drawing, this invention has been shown in one form as applied to milk pasteurizing apparatus comprising an electrode chamber 10 which functions to heat the milk. This electrode chamber 10 comprises a pair of spaced electrodes 11 positioned opposite each other, as shown, and between which the milk is caused to travel in a stream so as to form a conducting path between them and be heated. The milk is fed through the electrode chamber 10 by means of a pump 12, the intake of which is connected with a conduit 13 leading to a suitable source of milk supply, and the discharge of which is connected to a pipe 14. The pipe 14 is connected to the lower end of a regenerator or heat exchanger 15, the upper or discharge end of which is connected with the lower end of the electrode chamber 10 by means of a pipe 16. The heated pasteurized milk travels out from the upper end of the electrode chamber and flows into a holding tube 17 where it is held for some predetermined length of time, such as fifteen seconds, and from which it is delivered to a transverse discharge pipe 18 mounted above the regenerator 15 and provided with a series of discharge openings 19 in the top. The tube 18 is so arranged with relation to the regenerator 15 that the heated pasteurized milk discharged from the openings 19 flows downwardly over the regenerator to heat the relatively cool milk forced upwardly through the regenerator by the pump 12. Thus, the heat that is transferred from the heated milk to the incoming cooler milk to a large extent elevates the temperature to the desired pasteurizing temperature. It is the function of the electrode chamber 10 to elevate the temperature of the milk from that which it has after it leaves the regenerator to the pasteurizing temperature.

The pasteurized milk in gravitating from the regenerator 15 is directed over a cooling device 20 having a series of cooling pipes which cool the milk to a bottling temperature. Usually the device 20 is cooled by cold water which will be caused to flow through the cooling device; the water is introduced at the bottom by a pipe 20a and discharged at the top by a pipe 20b. The milk which falls from the cooling device 20 is collected in a trough 21 having a delivery tube 22. The delivery tube 22 conducts the milk to a suitable bottling machine (not shown).

The pump 12 is driven by a suitable constant speed motor 23, which preferably will be of the alternating current type, and which is connected to the pump by means of a shaft 23a.

The electrodes 11 are electrically supplied from a single phase, three-wire, alternating current source of supply 24. Connected in the electrical supply circuit is a controlling contactor 24a having an operating winding 24b. The voltage that is applied to the electrodes 11 is controlled by means of a suitable impedance device, such as a saturable reactor 25 which, as shown, is connected in the supply circuit in series with the electrodes 11 and the supply source 24. Preferably, a reactor will be used of the type described and claimed in the copending application of Martin A. Edwards, Serial No. 194,613, filed March 8, 1938, and assigned to the same assignee as this invention. This reactor is provided with four alternating current windings 26, 26a, 27 and 27a, which are mounted on a conventional four-legged iron core 28 having a relatively high permeability. The windings 26 and 26a are connected in series, and are wound on opposite legs of the two inner pair of legs, while the windings 27 and 27a are similarly connected and wound on opposite legs of the central pair of legs, as shown diagrammatically in the drawing. The saturable reactor 25 is further provided with a direct current control winding 29 mounted on the core 28 so as to link the two legs, and so as to set up a flux in opposition to the flux generated by the windings 26, 26a, 27 and 27a. Therefore, the voltage impressed on the electrodes 11 from the supply source 24 will depend upon the voltage of the control winding 29. When the voltage of the control winding decreases, the voltage drop across the alternating current windings 26, 26a, 27 and 27a of the reactor increases and, therefore, the electrode chamber voltage is decreased. Conversely, when the voltage in winding 29 increases, the voltage drop across the alternating current windings of the reactor decreases and the electrode chamber voltage increases.

The control winding 29 is controlled by means of a temperature responsive control device 30, the operation of which in turn is controlled by means of a bulb and bellows temperature responsive system. This system comprises a bulb 31 mounted so that it is immersed in the stream of heated pasteurized milk directly as it leaves the electrode chamber 10, and a bellows 32 connected in a closed fluid system with the bulb 31 by means of a tube 33. It will be understood that the bulb 31, the bellows 32 and the connecting tube 33 will be filled with a suitable sensitive temperature responsive liquid, such as alcohol. The temperature responsive control element 30 comprises an impedance bridge which is controlled by the bellows 32. The impedance bridge has a three-legged E-shaped core 34 of high permeability. Mounted on the two outside legs of this core are a pair of input alternating current windings 35 and 36 connected in series with each other so that they set up a flux flowing in the same direction in each leg. Thus, the flux set up by the windings 35 and 36, may have the directions indicated by the arrows a. Also mounted on these two outer legs of the core 34 are a pair of output windings 37 and 38 which are threaded by flux generated in the legs by the input windings and which are arranged to oppose each other. That is, the flux generated by the input windings 35 and 36 threads the windings 37 and 38 to induce in them voltages which oppose each other. The bridge further comprises an armature 39 which is pivotally mounted on a flexible spring strip 39a secured to the center leg of the core 34, as shown, and so that its opposite ends are spaced from the outer legs of the core. The armature, on its right-hand end, as viewed in the figure, carries an arm 40 which is positioned to be engaged by the bellows 32 when it expands. The armature is biased to move in a clockwise direction, as viewed in the figure, so that the arm 40 is moved toward the bellows by means of a spring 41 having one end anchored to the left-hand end of the armature and at its other end to a support 41a attached to the core. The left-hand end of the armature carries an adjustable screw 42 which is arranged to engage with a stop 43 also attached to the core. The stop is positioned so that when the screw 42 engages it, the air gaps between the ends of the armature and the outer legs of the core 34 are equal. Under these conditions, the same quantity of flux generated by the input windings 35 and 36 will thread the output coils 37 and 38, and inasmuch as these coils are connected to oppose each other, the effective output voltage of these coils will be zero. On the other hand, if the armature 39 is moved away from the stop to increase the length of the left-hand air gap and to decrease that of the right-hand gap an unbalance will be set up in the amount of flux which threads the two coils 37 and 38—more flux linking the right-hand coil and less the left-hand—and as a result an alternating current voltage will be generated in the output of these coils, the magnitude of which will depend upon the magnitude or the extent of the unbalance between the air gaps.

The core 34 has trunnions 46a that are supported in bearings (not shown) that pivotally support the core. A spring 46b biases the core in a clockwise direction, as viewed in the drawing. The movement of the core, however, is limited by a cam 46c, the position of which may be adjusted by a knob 46d. The position of the core and, therefore, the relation between the armature and the bellows 32 may be adjusted by the knob 46d.

The input coils 35 and 36 are fed from the supply source 24 through a transformer 44. As shown, the transformer 44 has a primary winding 44a which is fed from the neutral or center wire of the supply source 24 and from the upper outside wire of the supply source, the connections being controlled by a switch 45. The transformer 44 further comprises a secondary winding 44b which is connected to the opposite ends of the set of coils 35 and 36 connected in series. These connections are controlled by auxiliary contactor 64a of contactor 64, as shown. It will be observed that when the switch arm 45a is moved to close the switch contacts 45b, power will be applied to the primary winding 44a, and hence, through the transformer to the input windings 35 and 36. An adjustable resistance 46 is connected in the secondary circuit of the transformer to adjust the magnitude of the voltage applied to the input coils 35 and 36.

Output conductors 47 and 48 are connected to the output windings 37 and 38. The alternating current in the output conductors 47 and 48 generated by the flux in core 34 linking the output windings is rectified to a pulsating unidirectional current in a suitable rectifier 50 of any suitable type, but which preferably will be a copper oxide rectifier. The unidirectional current of the output of the rectifier 50 is used to control a suitable amplifier 51, which in turn is used to control the voltage impressed on the control winding 29 of the reactor 25.

The control winding 29 is electrically supplied by the primary winding 44a of the transformer 44 and a secondary winding 44c of this transformer connected to the primary to form an autotransformer, as shown. The amplifier 51 is connected between this transformer and the control winding 29 and controls the voltage impressed on the control winding.

The amplifier 51, while it may have any suitable construction, preferably will be of the magnetic type, and preferably will be arranged as the amplifier described and claimed in the copending application of Martin A. Edwards, S. N. 118,914, filed January 2, 1937. The amplifier 51 is shown diagrammatically, but it comprises two variable reactance windings 52 and 53 wound upon the two inner legs of a conventional four-legged saturable reactor core 54 in the manner shown in Fig. 2 in this Edwards application. The core is formed of a magnetic material having a relatively high permeability. Linking both of the inner legs of the core is a direct current control or input winding 55. The reactance windings 52 and 53 are connected in parallel between the supply transformer 44 and the control winding 29. Connected in series with the winding 52 is a unidirectional conducting device 56, and connected in series with the winding 53 is a similar unidirectional conducting device 57. These devices 56 and 57 may be of any suitable type of unidirectional conducting device, such as a conventional copper oxide rectifier. The unidirectional conducting devices 56 and 57 are reversely connected with respect to current flow in the supply circuit from the transformer 44, and in the load circuit, that is, the circuit of the coil 29, so that, for example, positive half cycles of load current flow through winding 52 and negative half cycles of load current flow through winding 53. In this manner, alternating current can circulate in the supply and load circuits, but only pulsating unidirectional current can flow in each of the reactance windings 52 and 53. Moreover, it is to be understood that the reactance windings are so connected or wound on their respective core legs that the pulsating unidirectional fluxes which they produce are in the same direction with respect to that of the input or direct current control winding 55. By properly selecting the number of turns of the reactance windings 52 and 53 with respect to the voltage of the supply side and the resistance of the coil 29, substantially all the voltage of the supply circuit can be made to appear across the reactance windings and the load circuit will be substantially deenergized by causing no current to flow in the direct current control winding 55. If, however, direct current is caused to flow in the control winding 55, the permeability of the core is reduced. This reduces the self-induced counter voltages in the reactance windings 52 and 53 so that the reactance voltage drops across these windings are reduced, and hence more current is permitted to flow into the load circuit to the winding 29 from the supply source, i. e., from the transformer 44. By increasing the direct current input to the control winding 55 until the core is saturated well beyond the knee of its saturation curve, the reactance of the windings 52 and 53 can be reduced so far that substantially all the supply voltage will be across the coil 29 and a very small percentage of it will be across the reactance windings 52 and 53. With this arrangement, the maximum input energy to the direct current winding 55 to control the power to the winding 29 is extremely small.

A compensating winding 58 is provided which is a direct current winding and which is energized from the secondary 44d of transformer 44 through a suitable rectifier 59, which may be and preferably will be a copper oxide rectifier. The compensating winding 58 is arranged to produce a magneto-motive force in opposition to the magneto-motive forces of the winding 52, 53 and 55, and the strength of this magneto-motive force is such as to neutralize the magneto-motive forces of the windings 52 and 53 when no current flows in the control winding 55. This materially increases the range of control of the amplifier 51 because unidirectional flux in the core 54 produced by the no-load, or maximum reactance, current in the windings 52 and 53 tends to produce some saturation in the core, and consequently, if this flux is bucked out or neutralized by the winding 58, the reactance of the windings 52 and 53 will be increased at such times as no current flows in the control winding 55.

Interposed between the secondary 44d and the compensating winding 58 is a non-linear resistance 60 and a linear resistance 61 for a purpose which will be described in greater detail hereinafter. In addition, there is provided an adjustable resistance 62 in this circuit which serves for adjusting or setting the amount of direct current in the compensating winding 58.

The alternating current output of the amplifier 51 is rectified in a suitable copper oxide rectifier 63 connected between the amplifier 51 and the control winding 29, the output of the amplifier 51 therefore being impressed on the winding 29 as a unidirectional pulsating current.

Connected in the energizing circuit of the pump motor 23 is a contactor 64 having an operating winding 65. This operating winding 65 is connected across one of the electrodes 11 and an auxiliary electrode 66 located above the electrode 11 in the milk stream so that the winding is supplied with the voltage drop in the milk stream between the two electrodes. Connected in the energizing circuit of the winding 65 is a contactor 67 which has an operating winding 68. This winding 68 is supplied by the voltage across the transformer winding 44c, and interposed between this transformer winding and the winding 68 is a copper oxide rectifier 69.

Also interposed in the control circuit of the winding 68 is a contact-making thermometer 70 having two terminals 70a and 70b connected in the circuit, and arranged so that when the mercury is above 70a the circuit is energized. As shown, the thermometer is connected in the milk stream where it leaves the electrode chamber 10. When the temperature of the treated milk falls below a predetermined minimum which corresponds to the position of the terminal 70a, the mercury in the thermometer will break the circuit of the winding 68, thereby permitting contactor 67 to close; this in turn energizes winding 65 to open contactor 64. Connected in parallel with the terminals of the thermometer 70 is a switch 71 having a fixed contact 71a and a movable contact 71b, and whose operation is controlled by the control device 30 to close the circuit to the winding 68 independently of the thermometer 70, under certain conditions of operation. The movable contact 71b is connected to the armature 39 of the device 30 by a resilient strip 71c. The functions of the contactors 64 and 67, the thermometer 70, and the switch 71 will be referred to in greater detail hereinafter.

The switch 45 is also provided with a switch contact 45c which when closed by the movable arm 45a completes an energizing circuit for the motor 23 only, the power in this position of the switch being disconnected from the remainder of the system. This is provided so that the pump 12 can be operated while no power is applied to the system for a purpose to be brought out later.

In the operation of the system, it will be understood that in starting up the apparatus it is usually desirable to bring the system up to temperature on a saline solution having approximately the same electrical conductivity as milk; and usually it is desired to heat the system up initially to some temperature slightly above the desired pasteurizing temperature to be held in the milk. For example, if the milk is to be treated at 162° F., the system will be heated initially up to say 165° F. In starting up, the switch member 45a is moved to close the contact 45c which connects the pump motor 23 between the upper outside conductor of the supply source 24 and the neutral wire of this supply source. The motor 23, therefore, is energized to drive the pump 12. The saline solution is fed into the pump intake 13 from some suitable source of supply and is delivered to regenerator 15, the electrode chamber 10, thence through the holding tube 17 to the discharge pipe 18. When the operator notices that the saline solution has reached the electrode chamber 10, he throws the switch arm 45a from the contact 45c to close contacts 45b. This maintains the energizing circuit for the pump motor 23 previously established, and furthermore, throws the whole system onto the power source 24; it will be observed that this operation of the switch connects the operating coil 24b of the contactor 24a across the upper conductor 24 of the supply source 24 and its neutral to close contactor 24a, and also, that the transformer 44 will be energized.

However, under these initial starting conditions, it is necessary to hold the contactor 64 closed even though the saline solution is cold, the mercury of the thermometer 70 lies below the terminal 70a, and the circuit of coil 68 is deenergized to open the pump circuit. To obviate this, the auxiliary switch 71 is positively closed by the attendant who operates the knob 46d to rotate the core 34 in a counterclockwise direction to close this switch. It will be observed that when this switch is closed power will be applied to the coil 68 to energize it to open the contactor 67, and thereby permit the pump contactor 64 to remain closed.

It will also be observed that when the core 34 is thus rotated to close the switch 71, it will have moved its right-hand leg into engagement with the armature and will have withdrawn its left-hand leg from the armature so that the condition for maximum power output of the control 30 is established. That is, the maximum output voltage of the windings 37 and 38 is established, is amplified in the device 51, rectified in device 63 and is applied to the control winding 29. As previously described, this applies the maximum power to the electrodes 11. Therefore, the saline solution that is being pumped through the electrode chamber 10 is rapidly heated to the desired temperature, which as previously pointed out, may be 165° F., and which may be read on the thermometer 70. Once this temperature of 165° F. has been established, the knob 46d is rotated to adjust the core and armature to a position with reference to the bellows 32 that corresponds to the temperature setting that it is desired to hold in the milk, which temperature, for example, may be 162° F. The temperature of the saline solution thereupon falls to 162° F., at which temperature it will be held by the control device 30. The flow of saline solution is then stopped and the flow of milk started, the milk stream following the end of the saline stream through the apparatus.

It will be understood that at the setting of 162° F. the armature 39 will occupy some position between its neutral position at which time it is against the stop 43 and the air gaps are equal, and its maximum power output position at which time its right-hand end engages the right-hand leg of the core 34. The control is so set that it will control between minimum and maximum temperatures of a very narrow temperature range corresponding to these two positions. In this specific application, it controls between limiting temperatures of plus and minus ½° above and below the set temperature of 162° F.

It will be understood that the milk temperature may vary from the set temperature of 162° F. for several reasons, such as variations in the initial temperature of the incoming cold milk, variations in its electrical conductivity, variations in the rate of flow of the milk, and variations in the voltage of the supply source 24. The bulb 31 responds instantly to those variations in milk temperature and effects immediately a change in the position of the armature 39 through the bellows 32 which expands and contracts as the temperature rises and falls. Should the temperature of the milk increase above the desired value of 162° F. the bellows will expand to move the armature toward its balanced position which reduces the output voltage of the device 30, and therefore, reduces the voltage applied to the direct current control winding 29 of the saturable reactor 25. This, as previously pointed out, reduces the power applied to the electrodes 11 so as to restore the temperature to the 162° F. value. Conversely, should the milk temperature fall below the desired value of 162° F. the bellows 32 will contract and the armature 30 will be moved by the spring 41 in a counterclockwise direction to increase the voltage output of the device 30, and, therefore, increase the voltage on direct current winding 29. This will permit more power to flow through the reactor 25 to the electrodes and, therefore, will increase the temperature of the milk to the desired value of 162° F. In this manner, the control device 30 continuously supplies a control voltage which is varied as an inverse function of variations in temperature in the milk stream. Power is continuously supplied to the electrodes 11, and is modulated by the control device 30 as the temperature of the milk varies in the electrode chamber so that all portions or sections of the milk stream flowing through the chamber 10 are continuously treated and are held at substantially the exact temperature set by the device 30, such for example, as the above-mentioned temperature of 162° F. The control device 30 is sufficiently sensitive to compensate for the temperature variations due to the above-mentioned factors so as to hold practically a constant temperature.

However, in some cases, it is desirable to remove from the temperature control member 30 the function of correcting for line voltage variations. For this purpose, the resistances 60 and 61, previously referred to, are connected in the system to control the compensating winding 58 of the amplifier 51. As previously explained, the resistance 60 is a non-linear resistance that is, it is arranged so that the voltage drop across it does not change with wide variations in voltage, while the resistance 61 is a linear resistance whose voltage drop varies directly with voltage variations. Assuming that the voltage drop of resistance 60 is greater than that of resistance 61, then the voltage drop in resistance 61 is always equal to the difference between the voltage impressed on the two resistances by the transformer and the constant voltage drop across the resistance 60; and as the resistances 60 and 61 are connected in the system so that the voltage impressed upon the winding 58 is equal to the difference in voltage drops of the two resistances, the voltage impressed on the winding 58 will vary inversely with variations in the supply voltage. This compensates for these variations, because it inversely varies the flux generated by winding 58 with variations in line voltage, and hence, it inversely varies the power delivered through the amplifier 51 with these variations. That is, as line voltage goes down, the voltage control winding 29 is increased to compensate for it, and conversely, when the line voltage increases, the voltage of the control winding 29 is reduced to hold the voltage on the electrodes constant.

If for any reason during the operation of the system, the milk that is being delivered by the electrode chamber 10 should fall below some minimum temperature, such as 160° F., the contact-making thermometer 70 falls to a level below the terminal 70a, and, therefore, breaks the circuit through the coil 68 which permits the contactor 67 to close. The coil 65, therefore, is energized by the voltage drop through the milk stream across electrode 11 and auxiliary electrode 66 to open the contactor 64 in the pump motor energizing circuit. The pump, therefore, is immediately deenergized, and the flow of milk through the apparatus ceases. At the same time that the pump is stopped, power is removed from the control element 30 by means of the auxiliary contactor 64a of contactor 64 which opens at the same time that contactor 64 opens. Power, however, is applied to the electrodes 11 through the reactor 25, but minimum power is applied because the winding 29 under these conditions will have its minimum voltage. When the pump 12 stops and the flow upwardly through the electrode chamber has ceased, the milk will gravitate back through the system in view of the fact that the pump 12 and supply source is located at a considerably lower liquid level than the level of the electrode chamber 10, and as it flows back will be heated at the minimum rate. When the milk flows back to such an extent that its level falls below the level of the auxiliary electrode 66, the operating winding 65 of contactor 64 will be deenergized, thereby permitting the contacts 64 and 64a to close. When these contacts close, they reenergize the pump motor 23 to start the pump 12 and the milk flow upwardly, and also apply power to the control member 30 of the system. The electrode voltage is increased to the maximum at once because the bulb 32 will have contracted sufficiently to permit the armature to move to its maximum unbalanced position to supply maximum voltage to control coil 29. The milk, therefore, is again forced upwardly by the pump, and is heated at the same time at the maximum rate. The milk in being forced up will cover the electrode 66, and the contact-making thermometer 70 will measure its temperature. In the event that the milk is still below 160° F., the energizing coil of contactor 67 will remain deenergized, while that for the contactor 64 will be energized through the auxiliary electrode 66 so that the switch contacts 64 and 64a will again be opened to stop the pump and remove the control member 30 from the system. Again, the milk will gravitate back through the electrode chamber and heated at the minimum rate until it again breaks the energizing circuit for coil 65 at electrode 66 to restart the pump, and to again connect the control member 30 in the system to provide maximum voltage to the electrodes 11. This cycle of operation will be repeated until the temperature in the milk is elevated to 160° F., or above, at which time the contact-making thermometer 70 will close the contact 70a, thereby energizing coil 68 to open contactor 67 which will prevent further energization of the coil 65 until the milk temperature again falls below the minimum of 160° F. No milk whatsoever, therefore, can possibly flow through the system that has not been treated at least to the minimum temperature of 160° F.

A temperature indicating or recording device 72 may be provided having a temperature responsive bulb 73 located in the path of the milk as it leaves the holding tube 17 and controlling a suitable temperature indicating pen in the device 72. Also, in the recorder 72 there may be provided a second pen (not shown) magnetically operated and connected across the pump motor circuit to indicate whenever a pump stop has occurred.

An important feature is the arrangement of the alternating current windings 26, 26a and 27, 27a of the saturable reactor 25. It will be understood that the milk stream is grounded, as at c, and that it is generally the practice to ground the center or neutral of the alternating current supply system 24, as indicated at d. Therefore, there is the possibility that unequal ground currents may be set up between the electrodes. This would unbalance the system and vary the milk temperature from the desired value—at times to such an extent that some of the milk would not be pasteurized. To obviate this difficulty, the windings 26 and 26a, and 27 and 27a are connected so that the two pairs are connected in two alternating current circuits respectively, each circuit including one winding on each leg of the core 28. Thus, coils 26 and 26a are connected in series in one circuit and are on opposite legs of the core, while the coils 27 and 27a are connected in series in the other circuit and are connected on the opposite legs of the core. With the four coils connected in this manner, the fluxes in the two legs are always equal no matter what ground currents may be flowing. This keeps the electrode chamber voltage symmetric with respect to the ground and reduces ground currents in case there is an unbalance since there is a greater voltage drop in the set of coils carrying the greater current, due to their resistance and leakage reactance. As pointed out previously, this specific reactor is described and claimed in the above-mentioned application of Martin A. Edwards, Serial No. 194,613.

At times it is desirable to wash out or sterilize the complete system through which the liquid flows. This may be accomplished in the same manner that the system is started up initially on a saline solution, as previously described. Thus, the cleansing or sterilizing solution is pumped through the system while power is off by throwing the switch to close contact 45c. This, as previously described, starts the pump and causes it to force the cleansing solution into and through the system. When the solution has reached the electrode chamber 10, the switch may be thrown to contacts 45b which operation applies power to the system and maintains the pump motor circuit energized. As when starting up, the control knob 46d of control 30 will be manually operated to close switch 71 so as to open contactor 67 and thereby permit contactor 64 to remain closed even though the liquid pumped in initially is cold. Maximum power, therefore, is applied to the liquid stream and it may be brought up to any suitable temperature, such as 185°, to cleanse the system.

The flexible arm 40 between the armature 39 and the bellows is formed as a bimetallic thermostat bar so as to compensate for changes in ambient temperature. Thus, in the event the ambient rises which would expand the bellows, the bar 40 rises at the same rate as the bellows to maintain the position of the armature. Conversely, if the bellows should contract due to a drop in the ambient, the bar 40 moves down at the same rate as the bellows.

While we have shown a particular embodiment of our invention, it will be understood, of course, that we do not wish to be limited thereto since many modifications may be made, and we, therefore, contemplate by the appended claims to cover any such modifications as fall within the true spirit and scope of our invention.

What we claim as new and desire to secure by Letters Patent of the United States, is:

1. A system for electrically heating a liquid comprising spaced electrodes, means for directing the liquid to be heated between the electrodes so that the liquid forms a resistance path between the electrodes and is thereby heated, an electrical supply circuit for said electrodes, and modulating temperature responsive means controlling said supply circuit active continuously to change the voltage as an inverse function of temperature variations in said liquid to maintain a substantially constant temperature in said liquid directed between said electrodes.

2. A system for pasteurizing a liquid comprising a chamber having spaced electrodes, means for moving the liquid through said chamber between said electrodes so that the moving liquid establishes a resistance path between them and is heated thereby, an electric supply source for said electrodes, and a modulating thermostat controlling said supply source responsively to the temperature of said liquid after being heated and active continuously to supply a modulated voltage that varies as an inverse function of changes in said temperature so as to hold a substantially constant temperature in said liquid.

3. A system for pasteurizing a liquid comprising a chamber having spaced electrodes, means for moving the liquid through said chamber between said electrodes so that the moving liquid establishes a resistance path between them and is heated thereby, means for continuously applying a voltage to said electrodes, and means responsive to the temperature of the heated liquid continuously active to control said voltage so that instantly upon a deviation in the liquid temperature from a predetermined value said means operates to apply a correction to said voltage to restore the temperature to said predetermined value.

4. A liquid pasteurizer comprising spaced electrodes, means for causing a stream of the liquid to flow between said electrodes at a substantially constant rate, an electrical supply circuit for said electrodes, and a modulating temperature responsive element responsive to the temperature of the liquid stream heated by said electrodes controlling said supply circuit and active continuously to supply a modulated voltage to said electrodes that varies as an inverse function to temperature variations in said liquid so as to hold a substantially constant temperature in said liquid.

5. A system for pasteurizing a liquid comprising a chamber having spaced electrodes, means for moving the liquid through said chamber between said electrodes so that the moving liquid establishes a resistance path between them and is heated thereby, an electrical supply circuit for said electrodes, a variable impedance device in said circuit controlling the voltage to said electrodes, and modulating means active continuously to vary instantly the impedance of said device when said temperature varies so as to restore said temperature to a preselected value.

6. In a heating system having heating means, an alternating current electrical supply circuit for said heating means, a variable impedance device in said circuit controlling the electrical voltage to said heating means, and modulating temperature responsive means associated with said heating means continuously active to control the impedance of said device in accordance with variations in temperature in said temperature responsive means.

7. In a heating system having heating means, an electrical supply circuit therefor, and a modulating temperature responsive means associated with said heating means continuously active to change the voltage of said supply circuit in accordance with temperature changes so that said voltage is varied as an inverse function of said temperature changes to hold a substantially constant temperature.

8. Apparatus for heating a liquid comprising means for heating the liquid, an alternating current electrical supply circuit for the heating means, a variable impedance device in said circuit controlling the voltage impressed on said heating means, and a modulating thermostat continuously responsive to the temperature changes of the liquid that is heated and active continuously to change the impedance of said device so that it continuously applies to said heating means a voltage that is modulated as an inverse function of temperature changes in said liquid to hold a substantially constant temperature in said liquid.

9. A system for pasteurizing a liquid comprising a chamber having spaced electrodes, means for moving the liquid through said chamber between said electrodes so that the moving liquid establishes a resistance path between them and is heated thereby, an electrical supply circuit for said electrodes, an impedance device connected in said circuit for controlling the voltage applied to said electrodes including a controlling direct current winding arranged to vary the impedance of said device and thereby the voltage to said electrodes when the voltage impressed on said direct current winding is varied, and means for varying the voltage impressed on said winding responsively to temperature changes in the liquid that is heated so as to vary the voltage applied to said electrodes to maintain a substantially constant temperature in said liquid.

10. In a heating system having heating means and an alternating current supply circuit for said heating means, a saturable reactor connected in said circuit to control said heating means, a direct current control winding for said saturable reactor, a modulating thermostat associated with said heating means continuously generating a voltage that is varied as an inverse function of variations in the temperature of the thermostat controlling the voltage impressed on said direct current control winding of said saturable reactor to hold a substantially constant temperature, and additional means operating responsively to variations in the voltage in said supply circuit controlling said direct current control winding to compensate for said variations.

11. A system for pasteurizing a liquid comprising a chamber having spaced electrodes, means for moving the liquid through said chamber between said electrodes so that the moving liquid establishes a resistance path between them and is heated thereby, an alternating current electrical supply circuit for said electrodes, a saturable reactor in said circuit for controlling the voltage applied to said electrodes and having a direct current control winding, an electrical supply circuit for said control winding, and means responsive to the temperature of the liquid that is heated controlling said circuit so that a direct current voltage is impressed on said control winding that varies as an inverse function of variations in said temperature, said saturable reactor thereby impressing on said electrodes a voltage that varies as an inverse function of said variations in said temperature in such an amount and order as to hold a substantially constant temperature in said liquid.

12. A system for pasteurizing a liquid comprising a chamber having spaced electrodes, means for moving the liquid through said chamber between said electrodes so that the moving liquid establishes a resistance path between them and is heated thereby, an alternating current electrical supply circuit for said electrodes, a saturable reactor having a direct current control winding connected in said circuit to control the voltage applied to said electrodes, an alternating current control circuit for said control winding, a modulating thermostat operating responsively to the temperature of the liquid that leaves said electrodes constructed and arranged to generate a voltage in said control circuit that varies as an inverse function of changes in said temperature, a magnetic amplifier in said circuit controlled by said generated voltage and a rectifier on the output side of said amplifier to supply a direct current voltage to said control winding that varies as an inverse function of said changes in said temperature.

13. A system for pasteurizing a liquid comprising a chamber having spaced electrodes, means for moving the liquid through said chamber between said electrodes so that the moving liquid establishes a resistance path between them and is heated thereby, an alternating current source of supply for said electrodes, an alternating current electrical supply circuit connecting said source of supply with said electrodes, a saturable reactor having a direct current control winding connected in said circuit to control the voltage applied to said electrodes, an alternating current control circuit for said control winding, a modulating thermostat operating responsively to the temperature of the liquid that leaves said electrodes constructed and arranged to generate a voltage in said control circuit that varies as an inverse function of changes in said temperature, a magnetic amplifier in said circuit controlled by said generated voltage, a rectifier on the output side of said amplifier to supply a direct current voltage to said control winding that varies as an inverse function of said changes in said temperature, and means controlling said amplifier responsively to variations in the voltage of said supply source to compensate for the effect of said variations in the voltage applied to said electrodes.

14. A system for pasteurizing a liquid comprising a chamber having spaced electrodes, means for moving the liquid through said chamber between said electrodes so that the moving liquid establishes a resistance path between them and is heated thereby, an alternating current electrical supply circuit for said electrodes, an impedance device in said circuit controlling the voltage to said electrodes, means responsive instantaneously to variations in the temperature of the liquid leaving said electrodes controlling the impedance of said device to impress upon said electrodes a voltage that holds a substantially constant temperature in said liquid, and an auxiliary control device responsive to variations in the voltage in said supply circuit controlling said impedance device to compensate for said voltage variations.

15. In a heating system having heating means, an alternating current source of supply for said heating means, a saturable reactor connected in said source of supply to control the voltage impressed on said heating means, a direct current control winding for said saturable reactor, a thermostat associated with said heating means generating a voltage that varies as an inverse function of variations in the temperature of the theremostat, a magnetic amplifier having a direct current control winding controlled by said voltage, a circuit controlled by said amplifier controlling the voltage impressed on the direct current control winding of said saturable reactor, a second direct current control winding for said saturable reactor and means controlling it responsively to variations in the voltage in said supply source to compensate for said voltage variations.

16. A system for pasteurizing milk and the like comprising a pair of spaced electrodes defining opposite sides of a liquid channel, a substantially constant speed pump for delivering milk to said electrodes at a substantially constant rate, an alternating current source of electrical supply for said electrodes and pump, an alternating current supply circuit connecting said supply source with said electrodes, a variable impedance device in said circuit controlling the voltage applied to said electrodes, a modulating thermostat constructed and arranged to generate continuously a voltage that is an inverse function of changes in temperature of the milk that leaves said electrodes between predetermined low and high temperature limits, means controlled by said voltage for varying the impedance of said impedance device, and means for stopping said pump and rendering said thermostat ineffective when the temperature of the milk falls below said predetermined low temperature.

17. Apparatus for heating liquid comprising means for heating the liquid, an alternating current electrical supply circuit for the heating means, a magnetic amplifier connected with said alternating current source of supply having an output circuit and a pair of direct current control windings, means controlling the voltage applied to one of said windings responsively to changes in the temperature of said liquid and means controlling the voltage applied to the other responsively to variations in the voltage of said supply source, control means in said output circuit and means controlled thereby controlling the voltage applied to said heating means.

18. A system for pasteurizing a liquid comprising a chamber having spaced electrodes, means for moving the liquid through said chamber between said electrodes so that the moving liquid establishes a resistance path between them and is heated thereby, an alternating current electrical supply source for said electrodes, a magnetic amplifier connected with said alternating current source of supply having an output circuit and a pair of direct current control windings, control means in said output circuit and means controlled thereby controlling the voltage applied to said heating electrodes, means controlling the voltage applied to one of said direct current control windings responsively to changes in the temperature of said heated liquid, a transformer connecting the other direct current control winding and said alternating current supply source, a non-linear resistance and a relatively smaller linear resistance connected across said transformer, connections tapped into the transformer and between said resistances connected to the terminals of said other control winding so that the voltage of said other winding is varied as an inverse function of variations in the voltage of said supply source, and a rectifier in said connections.

19. A heating system having heating means, an alternating current electrical supply circuit for the heating means, a control device having an impedance element that has input and output circuits, and windings in each of said circuits, those in the input circuit generating flux that induces a voltage in those in the output circuit modulating temperature responsive means continuously controlling said control device responsively to the temperature at said heating means so that the output voltage is varied as an inverse function of changes in said temperature, and means controlled by said control device controlling the voltage applied to said heating means so that it varies as an inverse function of said changes in temperature.

20. A heating system having heating means, an alternating electrical supply source for said heating means, a control device having an E-shaped core, an armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said output windings and in said output circuit, the value of said voltage depending upon the position of said armature with reference to said outer legs, a temperature responsive device having a control element in electrical relation with said heating means concontrolling the position of said armature, and means operated responsively to the voltage in said output circuit controlling the voltage of said supply circuit that is applied to said heating means.

21. A system for pasteurizing a liquid comprising a chamber having spaced electrodes, means for moving the liquid through said chamber between said electrodes so that the moving liquid establishes a resistance path between them and is heated thereby, an alternating current electrical supply source for said electrodes, a temperature responsive control device having an E-shaped core, an armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said output windings and in said output circuit, the value of said voltage depending upon the position of said armature with reference to said outer legs, means responsive to the temperature of said liquid leaving said electrodes controlling the position of said armature, and means operated responsively to the voltage in said output circuit controlling the voltage applied to said electrodes.

22. A system for pasteurizing a liquid comprising a chamber having spaced electrodes, means for moving the liquid through said chamber between said electrodes so that the moving liquid establishes a resistance path between them and is heated thereby, an alternating current electrical supply source for said electrodes, a temperature responsive control device having an E-shaped core, an armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said output windings and in said output circuit, the value of said voltage depending upon the position of said armature with reference to said outer legs, a stop limiting the movement of the armature in one direction so that when the armature is against said stop the air gaps between the armature ends and said outer legs are equal and substantialy no voltage is impressed on said output circuit, means biasing the armature in the opposite direction away from said stop, a bellows opposing said movement, a bulb in thermal relation with the liquid as it leaves said electrode chamber and connected in a closed fluid system with said bellows, an expansive fluid in said fluid system operating the bellows responsive to temperature changes in said liquid to vary the position of said armature and thereby the voltage in said output circuit as an inverse function of said temperature changes, and means operated responsively to the voltage in said output circuit controlling the voltage applied to said electrodes.

23. A system for pasteurizing a liquid comprising a chamber having spaced electrodes, means for moving the liquid through said chamber between said electrodes so that the moving liquid establishes a resistance path between them and is heated thereby, an alternating current electrical supply source for said electrodes, a temperature responsive control device having an E-shaped core, an armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said windings and in said output circuit, the value of said voltage depending upon the position of said armature with reference to said outer legs, a stop limiting the movement of the armature in one direction so that when the armature is against said stop the air gaps between the armature ends and said outer legs are equal and substantially no voltage is impressed on said output circuit, means biasing the armature in the opposite direction away from said stop, a bellows opposing said movement, a bulb in thermal relation with the liquid as it leaves said electrode chamber and connected in a closed fluid system with said bellows, an expansive fluid in said fluid system operating the bellows responsively to temperature changes in said liquid to vary the position of said armature and thereby the voltage in said output circuit as an inverse function of said temperature changes, means operated responsively to the voltage in said output circuit controlling the voltage applied to said electrodes, and means for changing the position of said core and armature with reference to said stop to change the temperature setting of said temperature responsive control device.

24. A system or pasteurizing a liquid comprising a chamber having spaced electrodes, means for moving the liquid through said chamber between said electrodes so that the moving liquid establishes a resistance path between them and is heated thereby, an alternating current electrical supply source for said electrodes, a temperature responsive control device having an E-shaped core, a armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said output windings and in said output circuit, the value of said voltage depending upon the position of said armature with reference to said outer legs, a member movable in response to the temperature of the liquid leaving said electrodes for moving said armature to control the voltage in said output circuit, a thermo-static element connecting said armature and said movable member to compensate for ambient temperature changes at said temperature responsive element, and means operated responsively to the voltage in said output circuit controlling the voltage applied to electrodes.

25. A system for pasteurizing milk and the like comprising a pair of spaced electrodes defining opposite sides of a liquid channel, a pump for delivering milk to said electrodes, a motor for driving said pump, an alternating current electrical supply circuit for said electrodes, an electrical supply circuit for said pump, a variable impedance connected in said first-named circuit controlling the voltage applied to said electrodes, a modulating thermostat that is continuously active to control the impedance of said device so that instantly upon a deviation in the milk temperature from a preselected value the voltage impressed on said electrodes is changed to restore the temperature in said milk to said preselected value, a switch in the pump supply circuit, and means responsive to the temperature of the heated milk controlling said switch to open the pump circuit when the temperature of the milk falls below a predetermined minimum.

26. A system for pasteurizing milk and the like comprising a pair of spaced electrodes defining opposite sides of a liquid channel, a pump for delivering milk to said electrodes, a motor for driving said pump, an alternating supply circuit for said electrodes, an electrical supply circuit for said pump, a variable impedance connected in said first-named circuit controlling the voltage applied to said electrodes, a modulating thermostat continuously controlling the impedance of said device in accordance with the temperature of the heated milk so that the voltage impressed on said electrodes is controlled to hold a substantially constant temperature in said milk, a contactor in the pump motor supply circuit having an operating winding, an energizing circuit for said winding including one of said electrodes and an auxiliary electrode in the milk stream above said electrode, a contactor in said energizing circuit having an operating winding and means controlled by the temperature of said heated milk controlling said energizing winding to normally hold said contactor open, but permitting it to close when the temperature of the milk falls below a predetermined minimum so as to energize the contactor in the pump motor supply circuit to open said circuit.

27. A system for pasteurizing milk and the like comprising a pair of spaced electrodes defining opposite sides of a liquid channel, a pump for delivering milk to said electrodes, a motor for driving said pump, an alternating supply circuit for said electrodes, an electrical supply circuit for said pump, a variable impedance connected in said first-named circuit controlling the voltage applied to said electrodes, a modulating thermostat continuously controlling the impedance of said device in accordance with the temperature of the heated milk so that the voltage impressed on said electrodes is controlled to hold a substantially constant temperature in said milk, a contactor in the pump motor supply circuit having an operating winding, an energizing circuit for said winding including one of said electrodes and an auxiliary electrode in the milk stream above said electrode, a contactor in said energizing circuit having an operating winding and means controlled by the temperature of said heated milk controlling said energizing winding to normally hold said contactor open but permitting it to close when the temperature of the milk falls below a predetermined minimum so as to energize the contactor in the pump motor supply circuit to open said circuit, and switching means for controlling the energization of said second-named contactor independently of said means controlled by the temperature of the heated milk.

28. A system for pasteurizing milk and the like comprising a pair of spaced electrodes defining opposite sides of a liquid channel, a pump for delivering milk to said electrodes, a motor for driving said pump, an alternating current electrical supply source for said electrodes, an electrical supply circuit for said pump connected to said source, a control device for said electrodes having an E-shaped core, an armature pivoted to the central leg of said core and having its ends spaced from and in magnetic relation with the outer two legs respectively, a pair of input windings on the outer legs connected in series and the two connected with said supply source, said windings generating flux in said legs and armature, a pair of output windings on said outer legs connected in opposition and to an output circuit, the flux generating voltage in said output windings and in said output circuit, the value of said voltage depending upon the position of said armature with reference to said outer legs, a temperature responsive device having a control element in electrical relation with said milk controlling the position of said armature, means operated responsively to the voltage in said output circuit controlling the voltage of said supply circuit that is applied to said electrodes, a contactor in the supply circuit for said pump motor, a temperature responsive device in the heated milk stream controlling said contactor to open this supply circuit when the temperature of the milk falls below a predetermined minimum, a switch controlling said contactor independently of said temperature responsive device, an operable connection between said switch and said armature, and means manually controlling the position of said armature to operate said switch.

29. A liquid treating system comprising spaced electrodes, means for causing the liquid to pass between the electrodes in a stream so as to be heated, means for grounding the liquid stream, a grounded three-wire alternating current source of supply, an alternating supply circuit for said electrodes having two conductors connected to the outside wires of said supply source, a saturable reactor in said circuit having a core with a pair of legs and a pair of alternating current windings on each leg, one winding on each leg being connected with a winding on the other to connect the four windings in pairs and each pair connected in one of said supply conductors so that the fluxes in the two legs are always equal irrespective of the flow of ground currents in said system, and means controlling said saturable reactor to control the voltage impressed on said electrodes and thereby the temperature of said liquid.

30. In a heating system, a grounded heating device, a grounded three-wire alternating electrical supply source for said device, a pair of conductors connecting two of the wires of said source with said electrodes respectively, a saturable reactor having a core with a pair of alternating current windings wound on each of two legs, each of the two conductors connected in series with two of the coils on opposite legs, a direct current control winding for said reactor, and temperature responsive means associated with said heating device controlling the voltage impressed on said direct current control winding to control the voltage of said electrodes.

CHESTER I. HALL.
MARTIN A. EDWARDS.

CERTIFICATE OF CORRECTION.

Patent No. 2,210,758. August 6, 1940.

CHESTER I. HALL, ET AL.

It is hereby certified that error appears in the printed specification of the above numbered patent requiring correction as follows: Page 8, first column, line 38, claim 15, for "theremostat" read --thermostat--; and second column, line 43, claim 19, before "modulating" insert a comma; page 9, first column, line 50, claim 22, for "substantialy" read --substantially--; and second column, line 33, claim 24, for the word "or" read --for--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.